US006401216B1

(12) United States Patent
Meth et al.

(10) Patent No.: US 6,401,216 B1
(45) Date of Patent: Jun. 4, 2002

(54) SYSTEM OF PERFORMING CHECKPOINT/RESTART OF A PARALLEL PROGRAM

(75) Inventors: Kalman Zvi Meth, Netanya (IL); Anton Prenneis, Highland, NY (US); Adnan M. Agbaria, Musmus (IL); Patrick Francis Caffrey, Glasco, NY (US); William Joseph Ferrante, Hyde Park, NY (US); Su-Hsuan Huang, Fishkill, NY (US); Demetrios K. Michailaros, Lake Katrine, NY (US); William Gole Tuel, Jr., Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,981

(22) Filed: Oct. 29, 1998

(51) Int. Cl.[7] ................................................ G06F 11/00
(52) U.S. Cl. .......................................... 714/16; 712/228
(58) Field of Search .............................. 714/16, 20, 25, 714/2, 5, 6, 11, 13, 42, 7, 39; 710/840, 841; 712/228

(56) References Cited

U.S. PATENT DOCUMENTS

| 4,703,481 A | | 10/1987 | Fremont ...................... 371/12 |
|---|---|---|---|
| 5,235,700 A | | 8/1993 | Alaiwan et al. ............. 395/575 |
| 5,269,017 A | | 12/1993 | Hayden et al. .............. 395/575 |
| 5,301,309 A | | 4/1994 | Sugano ....................... 395/575 |
| 5,317,739 A | | 5/1994 | Elko et al. ................... 395/650 |
| 5,321,698 A | | 6/1994 | Nguyen et al. ................ 371/12 |
| 5,410,685 A | | 4/1995 | Banda et al. ................ 395/575 |
| 5,440,726 A | * | 8/1995 | Fuchs et al. ............. 395/82.18 |
| 5,530,801 A | | 6/1996 | Kobayashi .............. 395/182.11 |
| 5,530,802 A | * | 6/1996 | Fuchs et al. ............ 395/182.15 |
| 5,551,043 A | | 8/1996 | Crump et al. ................ 395/750 |
| 5,581,778 A | | 12/1996 | Chin et al. ................... 395/800 |
| 5,583,987 A | | 12/1996 | Kobayashi et al. ..... 395/182.11 |
| 5,621,885 A | | 4/1997 | Del Vigna, Jr. ......... 395/182.11 |
| 5,630,047 A | | 5/1997 | Wang ..................... 395/182.13 |
| 5,634,096 A | * | 5/1997 | Baylor et al. .......... 395/182.04 |
| 5,644,742 A | | 7/1997 | Shen et al. .................. 395/591 |
| 5,706,489 A | | 1/1998 | Chi et al. .................... 395/569 |
| 5,712,971 A | | 1/1998 | Stanfill et al. ............. 395/183.1 |
| 5,737,514 A | | 4/1998 | Stiffler .................... 395/182.11 |
| 5,745,672 A | | 4/1998 | Stiffler .................... 395/182.04 |
| 5,748,882 A | * | 5/1998 | Huang ................... 395/184.01 |

(List continued on next page.)

OTHER PUBLICATIONS

Checkpoint and Migration of Unix Processes in the Condor Distributed Processing System, Todd Tannenbaum, Michael Litskow, Dr. Dobbs Journal, 227:40–48, Feb. 1995.

(List continued on next page.)

*Primary Examiner*—Nadeem Iqbal
(74) *Attorney, Agent, or Firm*—Lawrence D. Cutter, Esq.; Kevin P. Radigan, Esq.; Heslin Rothenberg Farley & Mesiti P.C.

(57) ABSTRACT

A checkpoint of a parallel program is taken in order to provide a consistent state of the program in the event the program is to be restarted. Each process of the parallel program is responsible for taking its own checkpoint, however, the timing of when the checkpoint is to be taken by each process is the responsibility of a coordinating process. During the checkpointing, various data is written to a checkpoint file. This data includes, for instance, in-transit message data, a data section, file offsets, signal state, executable information, stack contents and register contents. The checkpoint file can be stored either in local or global storage. When it is stored in global storage, migration of the program is facilitated. When a parallel program is to be restarted, each process of the program initiates its own restart. The restart logic restores the process to the state at which the checkpoint was taken.

20 Claims, 11 Drawing Sheets

U.S. PATENT DOCUMENTS

| | | | | |
|---|---|---|---|---|
| 5,751,939 A | | 5/1998 | Stiffler | 395/182.13 |
| 5,828,821 A | | 10/1998 | Hoshina et al. | 395/182.13 |
| 5,864,657 A | | 1/1999 | Stiffler | 395/182.13 |
| 5,884,021 A | | 3/1999 | Hirayama et al. | 395/182.11 |
| 5,907,673 A | | 5/1999 | Hirayama et al. | 395/182.14 |
| 5,907,678 A | * | 5/1999 | Housel, III et al. | 395/200.43 |
| 5,911,040 A | * | 6/1999 | Hirayama et al. | 395/183.14 |
| 5,933,593 A | | 8/1999 | Arun et al. | 395/182.04 |
| 5,941,999 A | * | 8/1999 | Matena et al. | 714/714.06 |
| 5,948,112 A | * | 9/1999 | Shimada et al. | 714/16 |
| 5,958,070 A | | 9/1999 | Stiffler | 714/13 |
| 5,996,088 A | | 11/1999 | Frank et al. | 714/6 |
| 6,009,414 A | | 12/1999 | Hoshiya et al. | 705/30 |
| 6,044,475 A | * | 3/2000 | Chung et al. | 714/15 |
| 6,055,546 A | | 4/2000 | Pongracz et al. | 707/202 |
| 6,105,148 A | * | 8/2000 | Chung et al. | 714/16 |
| 6,161,193 A | * | 12/2000 | Garg et al. | 714/6 |
| 6,161,196 A | * | 12/2000 | Tsai | 714/10 |
| 6,163,856 A | | 12/2000 | Dion et al. | 714/4 |
| 6,192,391 B1 | * | 2/2001 | Ohtani | 709/201 |
| 6,247,139 B1 | | 6/2001 | Walker et al. | 714/2 |
| 6,256,751 B1 | | 7/2001 | Meth et al. | 714/15 |
| 6,266,781 B1 | | 7/2001 | Chung et al. | 714/4 |

OTHER PUBLICATIONS

Supporting Checkpointing and Process Migration Outside the Unix Kernel, M. Litskow, M. Solomon, Proceedings of Usenix Winter 1992 Conference, Jan. 1992.

LIBCKPT: Transparent Checkpointing Under Unix, James S. Plank, Micah Beck, Gerry Kingsley, Kai Li, Usenix Winter 1995 Technical Conference, Jan. 1995.

An Overview of Checkpointing in Uniprocessor and Distributed Systems, Focusing on Implementation and Performance, James S. Plank, Technical Report UT–CS–97–372, University of Tennessee, Jul. 1997.

Efficient Checkpointing On MIMD Architectures, James Steven Plank, PhD Dissertation, Princeton University, Jun. 1993.

Checkpointing Distributed Shared Memory, Luis M. Silva, Joao Gabriel Silva, The Journal of Supercomputing, 11:137–158 (1997).

A Checkpointing Strategy for Scalable Recovery on Distributed Parallel Systems, Vijay K. Naik, Samuel P. Midkiff, Jose E. Moreira, IBM Research Report, Jun. 23, 1997.

* cited by examiner

INFORMATION ASSOCIATED WITH A PROCESS

MESSAGE 1. SSM_CHKPT_READY

MESSAGE 2. SSM_CHKPT_DO

MESSAGE 3. SSM_CHKPT_DONE

MESSAGE 4. SSM_CHKPT_COMMIT

WRITING CHECKPOINTS LOCALLY

INITIAL JOB EXECUTION

JOB RESTART (TASKS CANNOT MIGRATE)

SYSTEM OF PERFORMING CHECKPOINT/RESTART OF A PARALLEL PROGRAM

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"A METHOD OF PERFORMING CHECKPOINT/RESTART OF A PARALLEL PROGRAM," by Meth et al., Ser. No. 09/181,985,;

"PROGRAM PRODUCTS FOR PERFORMING CHECKPOINT/RESTART OF A PARALLEL PROGRAM," by Meth et al., Ser. No. 09/182,555,;

"CAPTURING AND IDENTIFYING A COMPLETE AND CONSISTENT SET OF CHECKPOINT FILES," by Meth et al., Ser. No. 09/182,175,;

"RESTORING CHECKPOINTED PROCESSES INCLUDING ADJUSTING ENVIRONMENT VARIABLES OF THE PROCESSES," by Meth et al., Ser. No. 09/182,359,; and "RESTORING CHECKPOINTED PROCESSES WITHOUT RESTORING ATTRIBUTES OF EXTERNAL DATA REFERENCED BY THE PROCESSES," by Meth et al., Ser. No. 09/182,725,.

TECHNICAL FIELD

This invention relates, in general, to processing of parallel programs and, in particular, to performing checkpoint and restart of a parallel program.

BACKGROUND ART

Enhancing the performance of computing environments continues to be a challenge for system designers, as well as for programmers. In order to help meet this challenge, parallel processing environments have been created, thereby setting the stage for parallel programming.

A parallel program includes a number of processes that are independently executed on one or more processors. The processes communicate with one another via, for instance, messages. As the number of processors used for a parallel program increases, so does the likelihood of a system failure. Thus, it is important in a parallel processing environment to be able to recover efficiently so that system performance is only minimally impacted.

To facilitate recovery of a parallel program, especially a long running program, intermediate results of the program are taken at particular intervals. This is referred to as checkpointing the program. Checkpointing enables the program to be restarted from the last checkpoint, rather than from the beginning.

One technique for checkpointing and restarting a program is described in U.S. Pat. No. 5,301,309 entitled "Distributed Processing System With Checkpoint Restart Facilities Wherein Checkpoint Data Is Updated Only If All Processors Were Able To Collect New Checkpoint Data", issued on Apr. 5, 1994. With that technique, processes external to the program are responsible for checkpointing and restarting the program. In particular, failure processing tasks detect that there has been a system failure. Restart processing tasks execute the checkpoint restart processing in response to the detection of the system failure, and checkpoint processing tasks determine the data necessary for the restart processing. Thus, the external processes are intimately involved in checkpointing and restarting the program.

Although the above-described technique, as well as other techniques, have been used to checkpoint and restart programs, further enhancements are needed. For example, checkpoint/restart capabilities are needed in which the checkpointing and restarting of a process of a parallel program is handled by the process itself, instead of by external processes. Further, a need exists for checkpoint/restart capabilities that enable the saving of interprocess message state and the restoring of that message state. Additionally, a need exists for a checkpoint capability that provides for the committing of a checkpoint file, so that only one checkpoint file for a process need be saved for restart purposes. Yet further, a need exists for a checkpoint capability that allows the writing of checkpoint files to either global or local storage. Further, a need exists for checkpoint/restart capabilities that allow migration of the processes from one processor to another.

SUMMARY OF THE INVENTION

The shortcomings of the prior art are overcome and additional advantages are provided through the provision of a system of checkpointing parallel programs. This system includes means for taking a checkpoint of a parallel program, which includes means for writing, by a process of the plurality of processes, message data to a checkpoint file corresponding to the process. The message data includes an indication that there are no messages, or it includes one or more in-transit messages between the process writing the message data and one or more other processes of the plurality of processes.

In one embodiment, the checkpoint file is stored in local storage accessible by the process. However, in a further embodiment, the checkpoint file is stored in global storage accessible by the plurality of processes of the parallel program.

In one aspect of the present invention, the system includes means for restoring the process that wrote the message data to the checkpoint file. The means for restoring includes means for copying the message data from the checkpoint file to memory of a computing unit executing the process. In one example, the computing unit executing the process is a different computing unit from when the checkpoint was taken by the process.

In another embodiment of the present invention, the means for taking a checkpoint includes means for taking a checkpoint by a number of processes. The means for taking a checkpoint by the number of processes includes means for writing data to a number of checkpoint files, wherein each process of the number of processes takes a corresponding checkpoint.

In a further example of the present invention, the system includes means for coordinating the taking of the corresponding checkpoints by the number of processes.

In yet another aspect of the present invention, a system of checkpointing parallel programs is provided. The system includes a computing unit being adapted to write to a data section of a process of a parallel program a signal state and/or one or more file offsets, and to subsequently write the data section to a checkpoint file corresponding to the process. Further, the computing unit is adapted to write message data to the checkpoint file, wherein the message data includes an indication that there are no messages, or it includes one or more in-transit messages between the process and one or more other processes of a parallel program. Additionally, the computing unit is adapted to write executable information, stack contents and/or register contents to the checkpoint file.

In a further aspect of the present invention, a system of restoring parallel programs is provided. The system includes, for instance, means for restarting one or more processes of a parallel program on one or more computing units, wherein at least one process of the one or more processes is restarted on a different computing unit from the computing unit that was previously used to take at least one checkpoint for the at least one process. The system of restoring further includes means for copying data stored in one or more checkpoint files corresponding to the one or more restarted processes into memory of the one or more computing units executing the one or more restarted processes.

In another aspect of the present invention, a system of checkpointing parallel programs is provided. The system includes means for indicating, by a process of a parallel program, that the process is ready to take a checkpoint; means for receiving, by the process, an indication to take the checkpoint; means for taking the checkpoint, wherein the means for taking the checkpoint includes means for having the process copy data from memory associated with the process to a checkpoint file corresponding to the process; and means for indicating, by the process, completion of the taking of the checkpoint.

In accordance with the principles of the present invention, checkpoint/restart capabilities are provided that allow the processes themselves to take the checkpoint and to restart after a failure. Additionally, in-transit messages between processes (interprocess messages) or an indication that there are no messages is saved during the checkpointing of the program. The messages are saved without having to log the messages in a log file. Further, after the processes have taken their checkpoints, the checkpoint files are committed, so that there is only one checkpoint file for each process at the time of restart. Yet further, the capabilities of the present invention allow the writing of checkpoints to either global or local storage. Additionally, migration of the processes from one system to another is allowed, when the checkpoints are written to global storage.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, checkpoints are taken within a parallel program so that the program may be restarted from an intermediate point should the program need to be restarted. For example, each process of the parallel program takes checkpoints at particular intervals. These checkpoints are performed internally by the processes, however, the timing of when the checkpoints are to be taken is coordinated by a coordinating process. During the checkpointing, various data is saved. This data includes, for instance, interprocess message data, signal state data, file offset information, register contents, executable information, a Data Section and/or stack contents. This data is used in the event the parallel program needs to be restarted. As with the checkpointing, the restarting of each process is handled internally by the process itself.

Figure 1A:
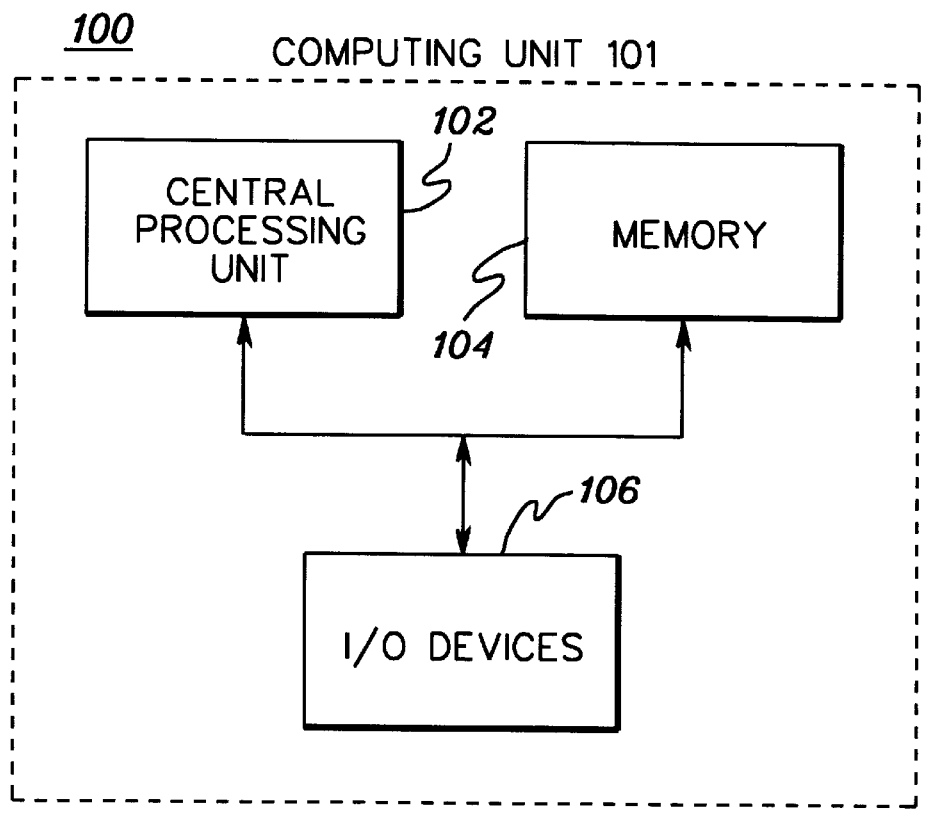
FIGS. 1a and 1b depict examples of computing environments incorporating and using the checkpoint/restart capabilities of the present invention.

One example of a computing environment incorporating and using the checkpoint/restart capabilities of the present invention is depicted in FIG. 1a. Computing environment 100 includes, for instance, a computing unit 101 having at least one central processing unit 102, a main memory 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions.

The central processing unit executes at least one operating system, which as known, is used to control the operation of the computing unit by controlling the execution of other programs, controlling communication with peripheral devices and controlling use of the computer resources.

Central processing unit 102 is coupled to main memory 104, which is directly addressable and provides for high speed processing of data by the central processing unit. Main memory 104 may be either physically integrated with the CPU or constructed in stand-alone units.

Main memory 104 and central processing unit 102 are also coupled to one or more input/output devices 106. These devices include, for instance, keyboards, communications controllers, teleprocessing devices, printers, magnetic storage media (e.g., tape, disks), direct access storage devices, sensor based equipment, and other storage media. Data is transferred from main memory 104 to input/output deices 106, and from the input/output devices back to main memory.

In one example, computing environment 100 is a single system environment, which includes an RS/6000 computer system running an AIX operating system. (RS/6000 and AIX are offered by International Business Machines Corporation). In another example, computing environment 100 includes a UNIX workstation running a UNIX-based operating system. Other variations are also possible and are considered a part of the claimed invention.

Figure 1B:
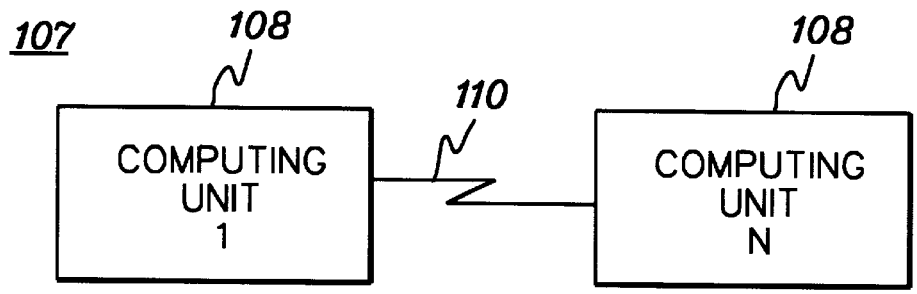

Another embodiment of a computing environment incorporating and using the checkpoint/restart capabilities of the present invention is depicted in FIG. 1b. In one example, a computing environment 107 includes a plurality of computing units 108 coupled to one another via a connection 110. In one example, each unit is a RS/6000 computing node running AIX, and the units are coupled together via a token ring or a local area network (LAN). Each unit includes, for example, a central processing unit, memory and one or more input/output devices.

In another embodiment, each unit is a UNIX workstation running a UNIX-based operating system, and the units are coupled to one another via a TCP/IP connection.

In yet a further embodiment, the environment includes a large parallel system with a plurality of units (e.g., 512 nodes) coupled to one another via a network connection, such as a switch. The invention is not limited to a particular number of units coupled together.

The above embodiments are only examples, however. The capabilities of the present invention can be incorporated and used with any type of computing environments or computing units (e.g., nodes, computers, processors, systems, machines, and/or workstations), without departing from the spirit of the present invention.

A computing unit of the present invention is capable of executing both serial and parallel programs. However, it is in the context of the parallel programs that the checkpoint/restart capabilities of the present invention are described (although various aspects of the present invention are also applicable to serial programs). A parallel program includes one or more processes (or tasks) that are executed independently. In one example, the processes of a parallel program are coordinated by a coordinating process. The processes of a parallel program communicate with each other and the coordinating process by, for instance, passing messages back and forth. In one example, a Message Passing Interface (MPI), offered by International Business Machines Corporation, is used to communicate between the various processes. MPI is described in "IBM Parallel Environment for AIX: MPI Programming and Subroutine Reference," IBM Publication No. GC23-3894-02 (August 1997), which is hereby incorporated herein by reference in its entirety.

Figure 2:
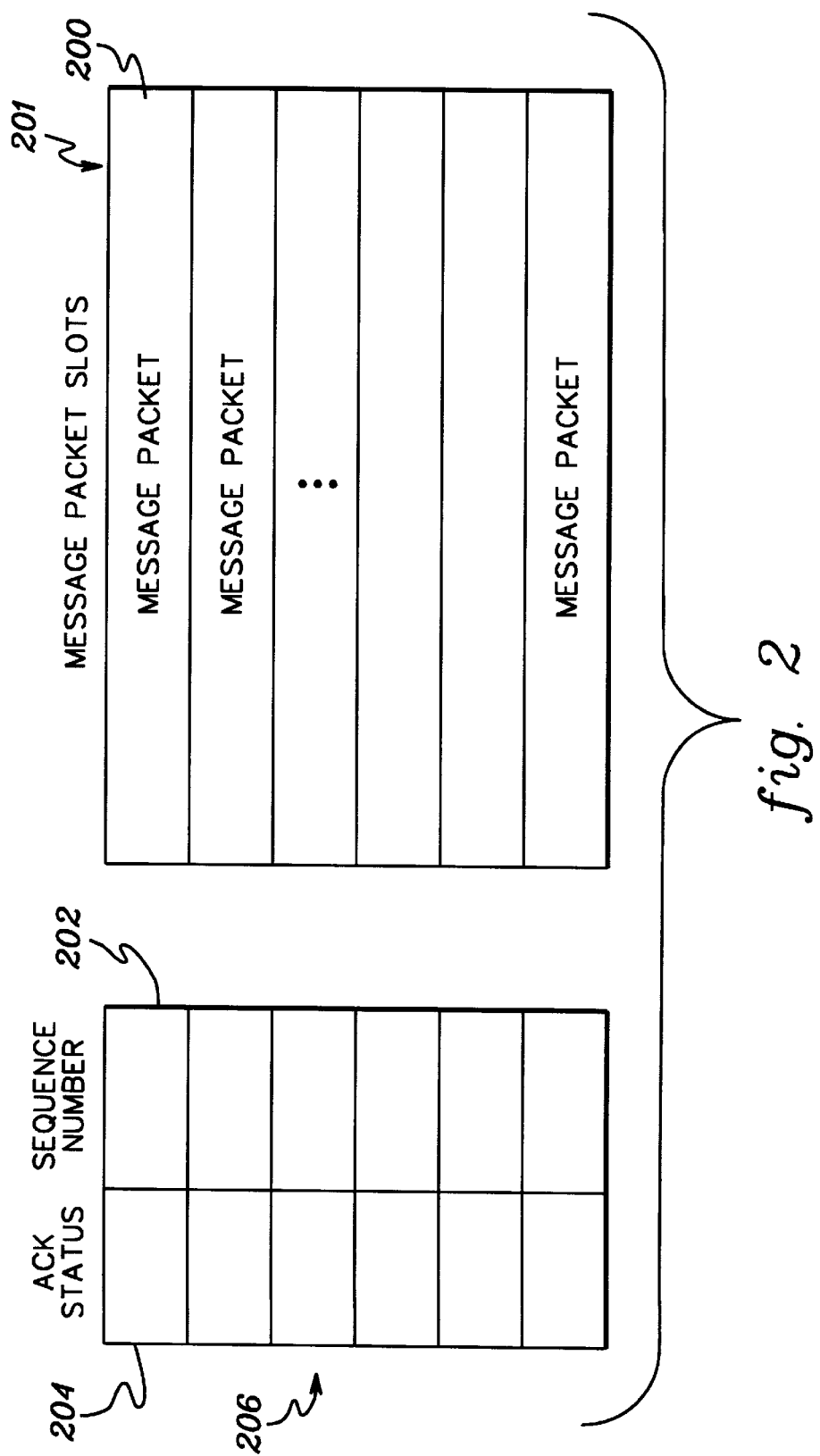
FIG. 2 depicts one example of message packets and information associated therewith, in accordance with the principles of the present invention.

In one example, the messages to be sent are segmented into packets 200 (FIG. 2) of some convenient maximum size, and copied into an array of packet slots 201. A next sequence number 202 is assigned to the packet, and an acknowledge (ack) status 204 corresponding to the packet is set to unacknowledged. The sequence number and ack status are stored in a parallel array 206 to the message packet slots. The message packet is then sent across the communication subsystem (in-transit). The sequence number is sent along with the message. At some subsequent time, the receiver of the message sends an acknowledgment message recording the highest consecutive sequence number received. This is used by the sender of the message to set the ack status to "received" for all packets up to and including that sequence number. Once the packet has been acknowledged, the slot can be freed for reuse. Periodically, unacknowledged packets are retransmitted. This is a standard technique for providing reliable transmission of messages over an unreliable medium.

Figure 3:
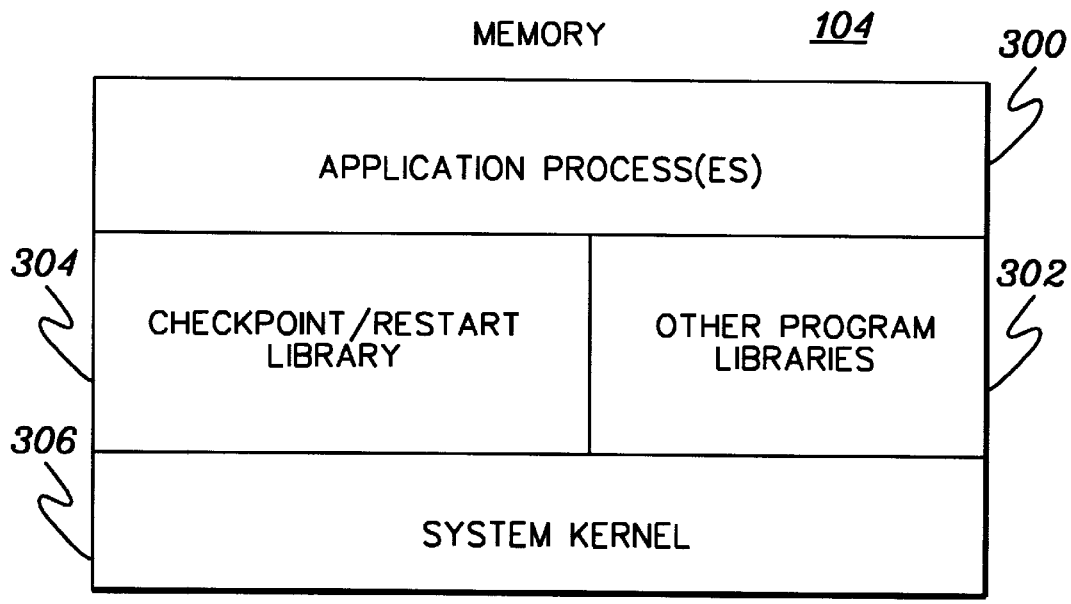
FIG. 3 depicts one example of various components of the memory depicted in FIG. 1a, in accordance with the principles of the present invention.

Each process of a parallel program is loaded in the memory of the computing unit that is to execute the process. This is depicted in FIG. 3. As one example, memory 104 includes one or more application processes 300. Each process may make library calls to various program libraries 302, also loaded within the memory. One program library that is called, in accordance with the principles of the present invention, is a checkpoint/restart library 304. Checkpoint/restart library 304 is called by each process that wishes to use the checkpoint/restart capabilities of the present invention. In addition to the above, memory 104 includes a system kernel 306, which provides various system services to the application processes and the libraries.

Figure 4:
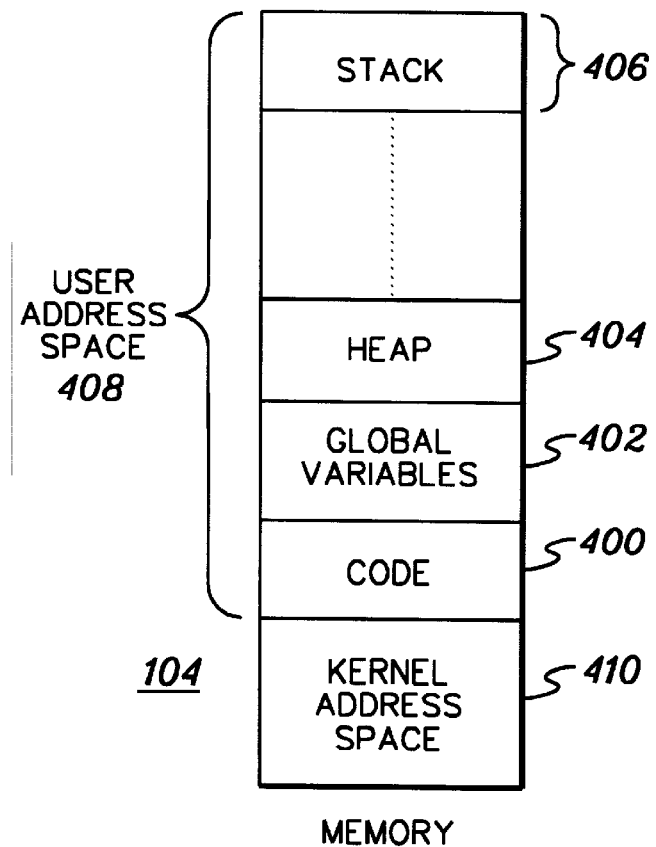
FIG. 4 depicts one embodiment of a memory layout of a process, in accordance with the principles of the present invention.

Memory 104 is further described with reference to FIG. 4, which depicts one embodiment of the memory layout for an application process. In particular, for each process, memory 104 includes programming code 400, global variables 402 used by the process, a heap 404 (for dynamic memory allocation while the program is running), and a stack 406. The global variables and the heap are referred to as the "Data Section" of the process, which is distinct from the stack of the process. Each process running in the computing unit has, in addition to its code, a separate portion of memory to store its Data Section and stack. This section is referred to as a user address space 408. In addition to the user address space, the memory includes a kernel address space 410 for running the system kernel.

Figure 5:
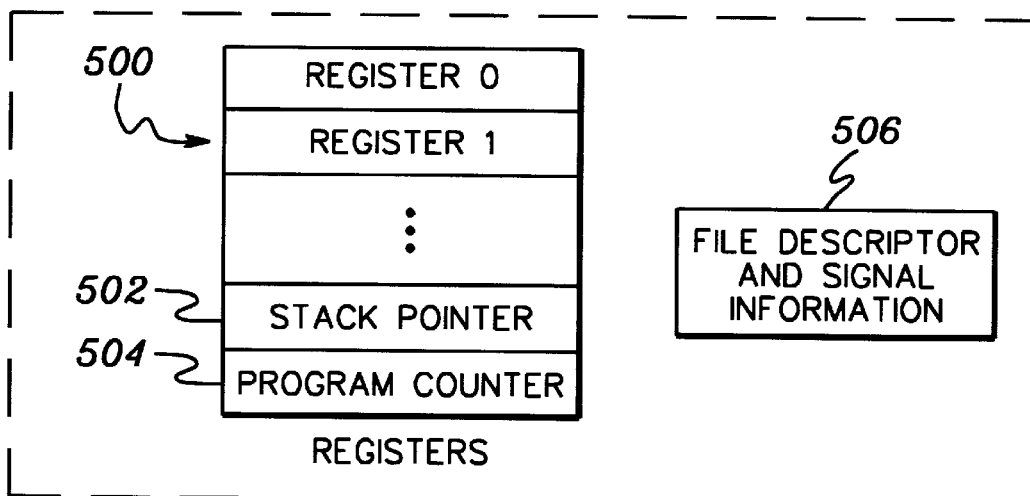
FIG. 5 depicts one example of registers, file descriptors and signal information associated with a process, in accordance with the principles of the present invention.

Each process running in the computing unit also has a separate copy of registers 500 (FIG. 5), which includes a stack pointer 502 and a program counter 504. Further, each process has associated therewith various file descriptor and signal information 506.

Figure 6:
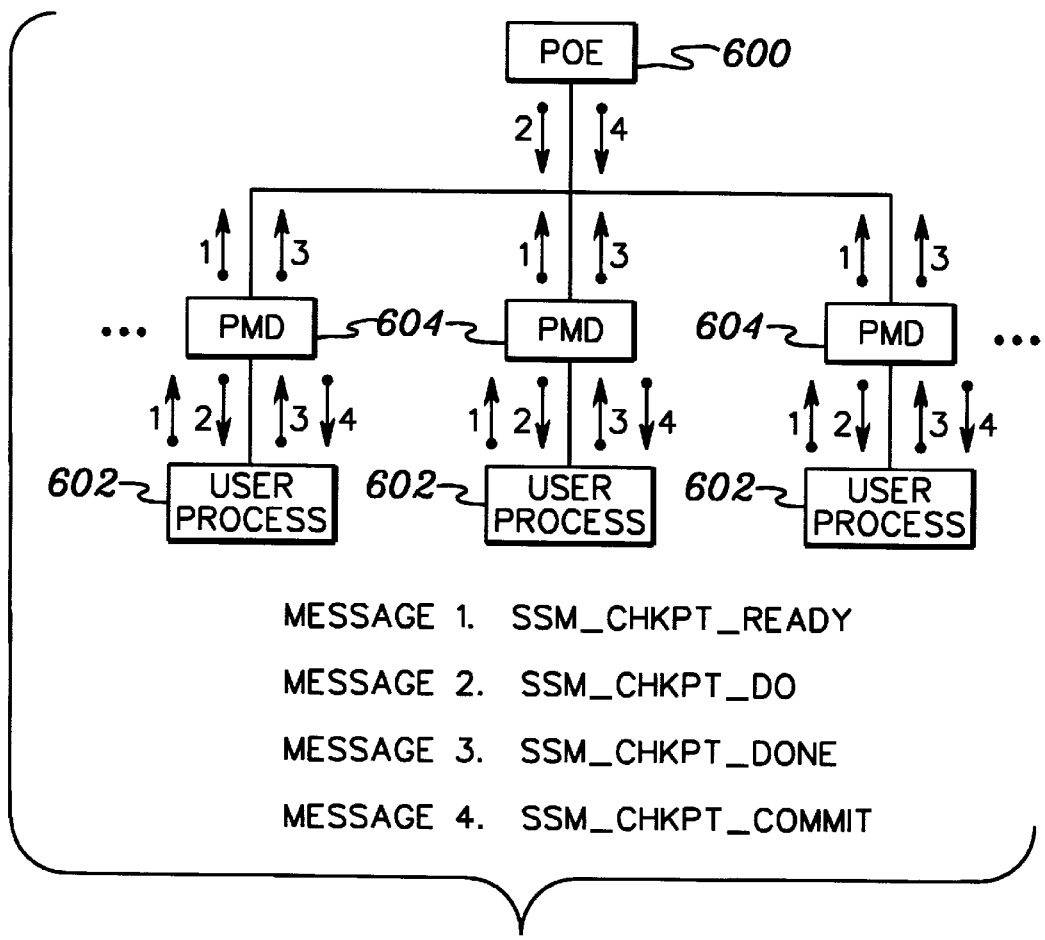
FIG. 6 illustrates one example of message communication between a coordinating process and user processes, in accordance with the principles of the present invention.

In accordance with the principles of the present invention, each individual process of the parallel program (that is participating in the checkpoint/restart capabilities of the present invention) is responsible for taking its own checkpoint and for restarting itself in the event of a failure. However, the timing of when the individual checkpoints are to be taken by the user processes is the responsibility of a coordinating or master process. Communication between the user processes and the coordinating process is illustrated in FIG. 6.

A coordinating process 600 receives messages initiated by user processes 602. In one example, coordinating process 600 is the Parallel Operating Environment (POE) offered by International Business Machines Corporation. The user processes send the messages to the POE via, for instance, a partition manager daemon (PMD) 604, which is also offered by International Business Machines Corporation as part of the POE. The PMDs are also used by coordinating process 600 to send messages to the user processes. POE and PMD are described in detail in "IBM Parallel Environment For AIX: Operation and Use," Vols. 1&2, IBM Publication Nos. SC28-1979-01 (August 1997)and SC28-1980-01 (August 1997), which are hereby incorporated herein by reference in their entirety.

Figure 7:
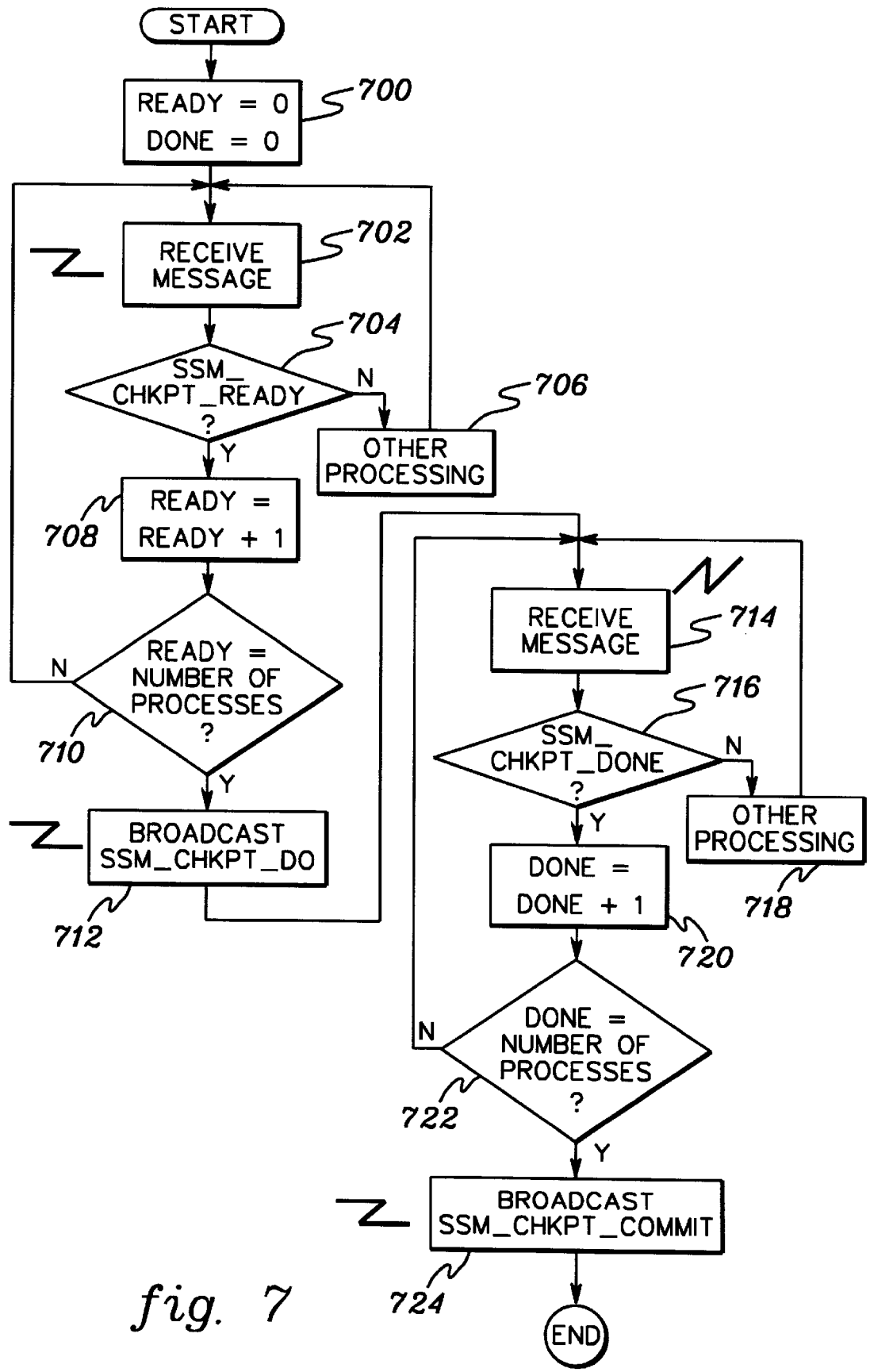
FIG. 7 depicts one embodiment of the logic associated with synchronizing checkpointing among various processes, in accordance with the principles of the present invention.
Figure 8:
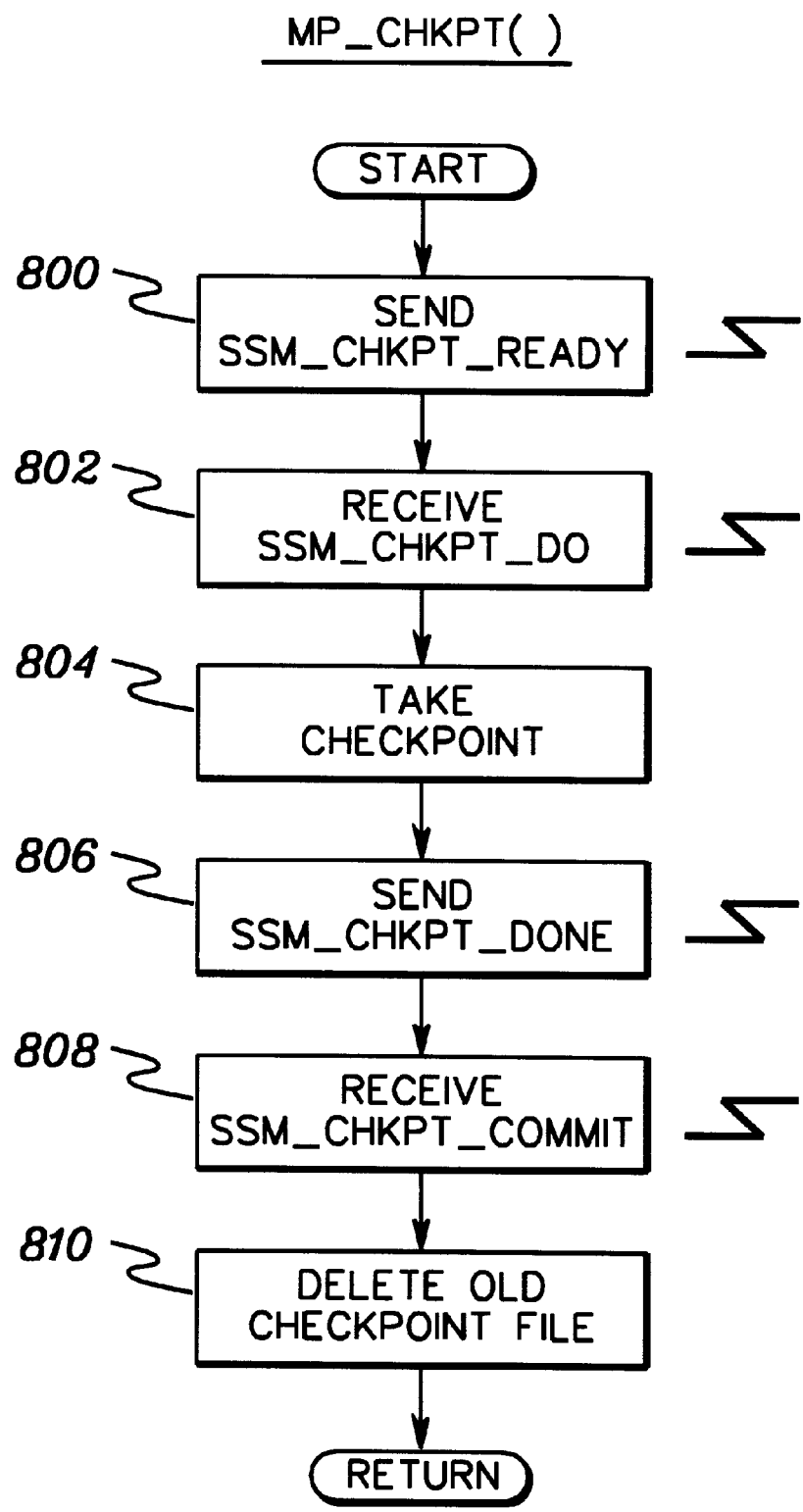
FIG. 8 depicts one embodiment of the logic associated with initiating the taking and committing of a checkpoint, in accordance with the principles of the present invention.

In particular, each user process sends a Checkpoint Ready message (message 1), when it is ready to take a checkpoint, and a Checkpoint Done message (message 3), when it has completed taking the checkpoint. Likewise, the coordinating process sends a Checkpoint Do message (message 2), when it is time for the processes to take a checkpoint, and a Checkpoint Commit message (message 4), when the user processes are to commit to the new checkpoint. The use of these messages are further described below with reference to FIGS. 7 and 8. FIG. 7 describes processing from the point of view of a coordinating process and FIG. 8 describes processing from the point of view of a user process.

Referring to FIG. 7, one embodiment of the logic associated with the checkpoint synchronization provided by the coordinating process is described in detail. Initially, two variables to be used during the synchronization process, referred to as READY and DONE, are initialized to zero, STEP 700.

When a message is received by the coordinating process, STEP 702, a determination is made as to whether the message is a Checkpoint Ready message sent by a user process, INQUIRY 704. If the message is not a Checkpoint Ready message, then the coordinating process proceeds with other processing, STEP 706, and flow returns to STEP 702 "RECEIVE MESSAGE".

On the other hand, if the message is a Checkpoint Ready message sent by a user process that is ready to take a checkpoint, then the processing variable referred to as READY is incremented by one, STEP 708. Subsequently, a determination is made as to whether all of the participating processes of the parallel program are ready to take a checkpoint. In particular, a check is made to see whether READY is equal to the number of processes initiated (or indicated as participating) for the parallel program, INQUIRY 710. If there are still processes that have not sent the Checkpoint Ready message to the coordinating process, then the processes do not take the checkpoint yet, so flow returns to STEP 702 "RECEIVE MESSAGE".

However, if the coordinating process has received a Checkpoint Ready message from each of the processes of the parallel program, then the coordinating process broadcasts a Checkpoint Do message to each of the processes, STEP 712. This indicates to the processes that each process can now take its checkpoint.

After each process takes its checkpoint, it sends a Checkpoint Done message to the coordinating process indicating that it is done taking the checkpoint. When the coordinating process receives a message, STEP 714, it determines whether the message is the Checkpoint Done message, INQUIRY 716. If it is not a Checkpoint Done message, then the coordinating process continues with other processing, STEP 718, and flow returns to STEP 714 "RECEIVE MESSAGE".

On the other hand, if the coordinating process has received a Checkpoint Done message from a user process, then the variable referred to as DONE is incremented by one, STEP 720. Thereafter, a determination is made as to whether all of the participating processes of the parallel program have completed taking their checkpoints. In particular, DONE is compared to the number of processes initiated (or indicated as participating) for the parallel program, INQUIRY 722. If DONE is not equal to the number of processes, then flow returns to STEP 714 "RECEIVE MESSAGE".

However, if each of the processes has sent a Checkpoint Done message to the coordinating process, then the coordinating process broadcasts a Checkpoint Commit message to all of the processes, STEP 724. At this time, each of the processes can commit to the checkpoint just taken. This completes the checkpoint synchronization performed by the coordinating process.

Although it is the responsibility of the coordinating process to inform each of the user processes of when to take a checkpoint, it is the user process itself that takes the checkpoint. In one example, in order to take a checkpoint, a user process calls mp_chkpt( ) from the checkpoint/restart library. The logic associated with this library function is described below with reference to FIG. 8.

When a user process is ready to take a checkpoint, it sends a Checkpoint Ready message to the coordinating process via the PMD, STEP 800. After it sends the message, it waits until it receives the Checkpoint Do message from the coordinating process.

Upon receiving the Checkpoint Do message from the coordinating process, STEP 802, the user takes a checkpoint, STEP 804. The checkpoint processing, which is described in further detail with reference to FIG. 9, copies the state of the process out to a checkpoint file on external storage media (e.g., disk). Subsequent to taking the checkpoint, the user process sends the Checkpoint Done message to the coordinating process, STEP 806. At this point, the user process stops processing until it receives the Checkpoint Commit message from the coordinating process.

When the coordinating process receives a Checkpoint Done message from each of the participating user processes (e.g., the processes of the parallel program), it broadcasts the Checkpoint Commit message to each of the participating user processes. When the user process receives the commit message, STEP 808, it deletes any older version of the checkpoint file, STEP 810. Thus, there is only one checkpoint file for the process, which corresponds to the checkpoint that was just taken. This completes the processing initiated by a user process to take and commit checkpoint.

Figure 9:
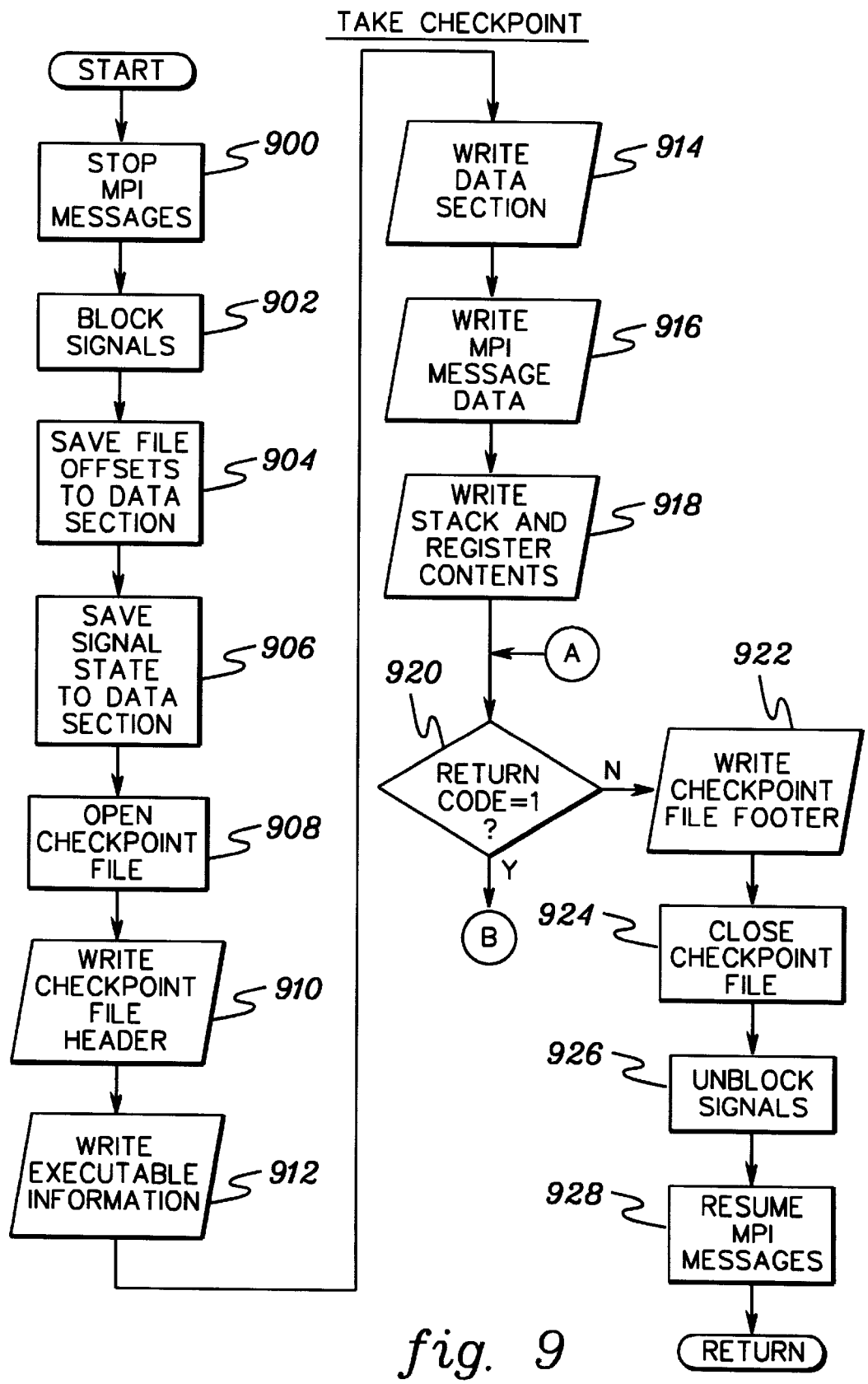
FIG. 9 depicts one embodiment of the logic associated with taking a checkpoint, in accordance with the principles of the present invention.

Further details of taking a checkpoint, in accordance with the principles of the present invention, are described in detail with reference to FIG. 9. In one embodiment, in order to take a checkpoint, the user process stops message traffic (e.g., message passing interface (MPI) messages), STEP 900. In particular, it stops sending messages to other processes, including the coordinating process and other user processes, and it stops receiving messages from other processes.

In addition to stopping the messages, the user process also blocks signals, STEP 902. This prevents an inconsistent state of the data. For example, if delivery of a signal was allowed, it opens the possibility that the parallel program has installed a signal handler which can interrupt the checkpointing operation and change the program state. This can then result in an inconsistent checkpoint. Thus, all signals are blocked during the taking of the checkpoint.

After stopping the messages and blocking the signals, the file offsets of any open files of the process are saved to the Data Section (in memory) of the process, STEP 904. Additionally, the signal state is also saved to the Data Section, STEP 906. The signal state includes any pending signals received from other processes that have not been processed or any signal masks that define what to do if certain signals are received. The signal state information also includes information about the process' signal handlers. The saving of the file offsets and the signal state to the Data Section ensures that the offsets and signal state can be found during a restore, since the entire Data Section is saved to the checkpoint file, as described below. (In another embodiment, the signal state and file offset information are stored directly in the checkpoint file (after it is opened), without first copying it to the Data Section.)

Thereafter, a checkpoint file corresponding to the process is opened, STEP 908. The checkpoint file is located via, for instance, environment variables that are used to define the environment and are stored in memory. It is the environment variables that provide the name of the checkpoint file and the directory in which the checkpoint file is stored. Once the checkpoint file is opened, a checkpoint file header is written, which indicates that this is the start of the checkpoint file, STEP 910.

Subsequently, additional information needed to restore the process in the event of a failure is written to the checkpoint file. For instance, executable information is written to the checkpoint file, STEP 912. This information identifies the program to be restarted. (Note that programming code is not written.) Further, the Data Section, which includes the file offsets and signal state, is also written to the checkpoint file, STEP 914.

Additionally, any in-transit message data is also written to the checkpoint file, in accordance with the principles of the present invention, STEP 916. (In another embodiment, the in-transit message data may be contained within the Data Section.) In-transit message data includes, for instance, either an indication that there are no messages, or it includes those messages received by the process that have yet to be processed and messages sent from the process to other processes that the process has not received acknowledgments thereto. The in-transit message data is written to the checkpoint file without first writing it to a log file. (Other data written to the checkpoint file also need not be logged, prior to writing it to the checkpoint file.)

The checkpointing of the message data saves, for instance, array of packet slots 201 (FIG. 2), as well as sequence number 202 and ack status 204. Since any unacknowledged packet is eventually retransmitted, the in-transit messages can be recreated during restart. The sequence number assures that the receiver can screen for duplicates, since it is possible that the receiver has received the packet but has not acknowledged it yet.

In addition to the above, any stack and register contents are also written to the checkpoint file, STEP 918. The stack includes data that is local to the subroutines that are being processed (one subroutine having made a call to another subroutine, etc., so that the local variables of all of the active subroutines are on the stack), as well as information needed to return from a called subroutine when that subroutine has completed.

After the information needed to restore the process back to the state it was in when the checkpoint was taken is written to the checkpoint file, a determination is made as to whether this is the checkpoint process or a restart process, INQUIRY 920. In particular, the value of a return code is checked to see if it is equal to one, INQUIRY 920. Since this is the checkpoint process, the return code is equal to zero and processing continues with STEP 922.

At STEP 922, a checkpoint file footer is written to the checkpoint file, and then, the checkpoint file is closed, STEP 924. After the checkpoint file is closed, the signals are unblocked and MPI messaging is resumed, STEP 928. This completes the checkpoint process.

In one embodiment, each participating process of the parallel program performs the checkpoint process. This ensures data integrity. One example of pseudocode used to perform the checkpoint process is depicted below. As can be seen, various Message Passing Interface (MPI) calls are made. The use of MPI is only one example, however. Communication between the user processes and between the user processes and the coordinating process can be by any means.

```
mp_chkpt( )
    sendPOEMessage (SSM_CHKPT_READY);
    recvPOEMessage (SSM_CHKPT_DO);
    mp_stopMPI( );
    blockSignals( );
    saveFileOffsets( );
    saveSignalInfo( );
    chkptFd = openChkptFile(chkptFile);
    writeChkptFileHeader(chkptFd);
    writeExecInfo(chkptFd);
    saveDataSegment(chkptFd);
    mp_saveMPIData(chkptFd);
    rc = saveStack(chkptFd);
    /* rc = 0 during checkpoint; rc = 1 during restart */
    if (rc == 1) {
        handleRestart( );
        return(1);
    }
    writeChkptFileFooter (chkptFD);
    closeChkptFile(chkptFd);
    unblockSignals( );
    mp_resumeMPI( );
    sendPOEMessage(SSM_CHKPT_DONE);
    recvPOEMessage(SSM_CHKPT_COMMIT);
    deleteOldChkptFiles(chkptFile);
```

Figure 10:
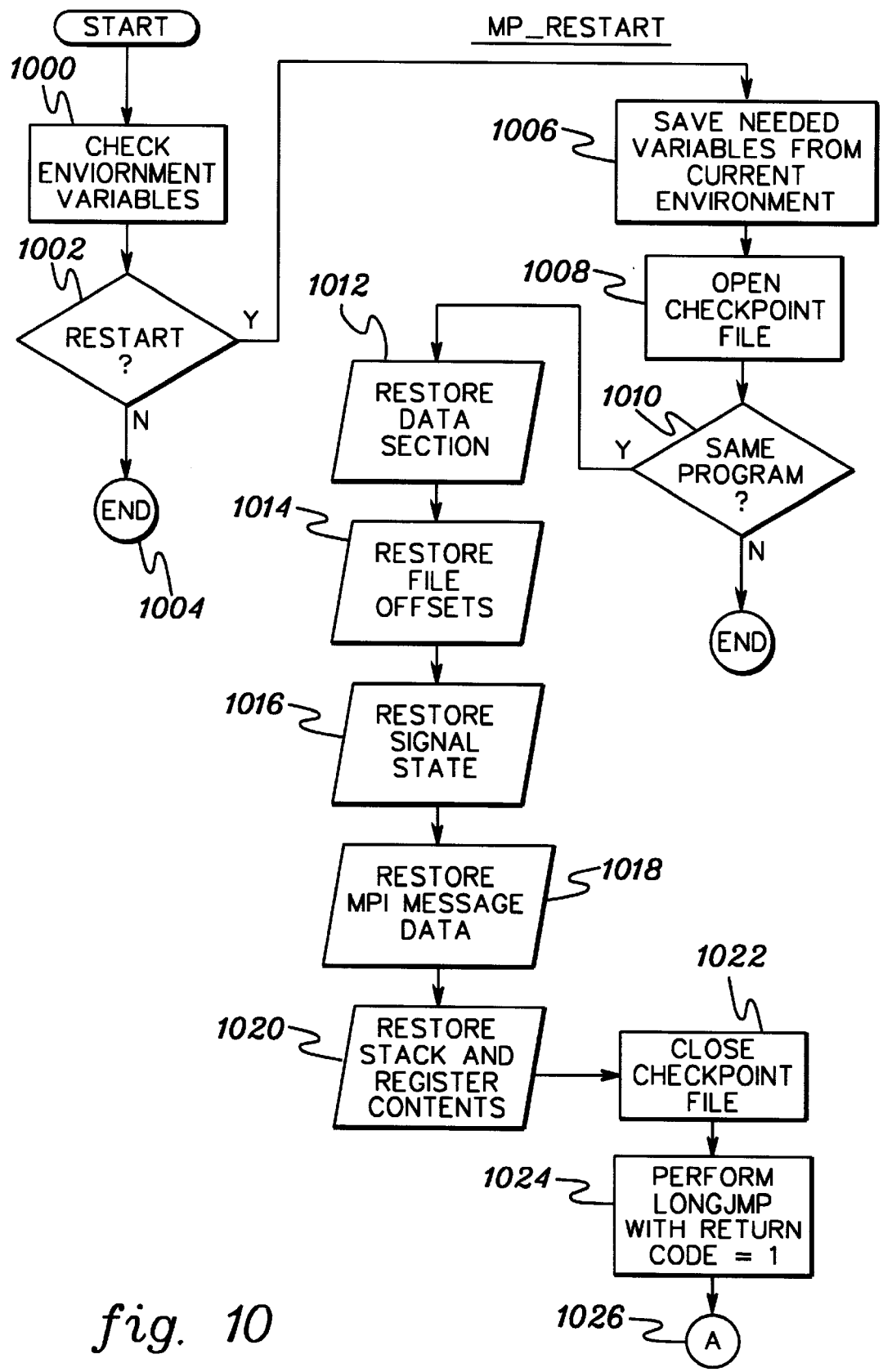
FIG. 10 depicts one embodiment of the logic associated with restarting a process using the checkpoint data previously taken, in accordance with the principles of the present invention.

Should a parallel program need to be restarted, each participating user process of the parallel program initiates a restart process. In one example, the restart process is initiated by calling mp_restart located within the checkpoint/restart library. One embodiment of the logic associated with restart is described with reference to FIG. 10.

Initially, environment variables are checked to determine whether the parallel program is being initiated or reinitiated, STEP 1000. In particular, a restart state stored as part of the environment variables is used to make this determination. If the process is not being restarted, INQUIRY 1002, then restart processing is complete, STEP 1004.

However, if this is a restart, then information needed from the current environment is saved, STEP 1006. This information includes environment information that may have changed between the time the checkpoint was taken and the restart. For instance, the environment information may include the list of computing units running the processes, if one or more of the processes has been migrated to one or more new computing units. Additionally, other environment variables relating to the parallel process are also saved. This includes, for example, the Internet address of the other processes in the parallel program, whether or not to write output to a file or a computer terminal screen, information about the message passing network, and various other variables that are only valid now, at restart time, of which the data in the checkpoint file is stale.

After saving any needed variables from the current environment, the checkpoint file is opened, STEP 1008. Subsequently, a determination is made as to whether this is the same parallel program that was running, INQUIRY 1010. In one embodiment, this determination is made by comparing various execute information (e.g., checksum and other information) relating to the original application stored in the checkpoint file with corresponding information of the program trying to be restarted.

If this is not the same program, then the restart process is complete. However, if it is the same program, then the restoring of the process from the checkpoint file begins. During the restoration, the process is restored to the state it was in when the checkpoint was taken.

In particular, the Data Section is restored by copying the Data Section from the checkpoint file into memory of the computing unit executing the process, STEP 1012. Then, from the Data Section, any file offsets and signal state are restored, STEPS 1014 and 1016. Additionally, any message data is restored by copying the data from the checkpoint file to memory, STEPS 1018.

Further, the register contents and the stack contents are restored, STEP 1020. When performing user-level checkpoint/restart, there is difficulty in restoring the stack. This is because the process is running on its stack, while it is performing its restart operation. Since the process is using the stack during restart, it cannot safely overwrite its stack with the saved checkpoint stack. Thus, a temporary stack is used. The temporary stack is allocated (up-front) in the Data Section of the process. The process switches to the temporary stack by using, for instance, a setjmp/longjmp mechanism and by manipulating the stack pointer entry provided by the setjmp call. While running on the temporary stack, the original stack is restored. In particular the stack contents are copied from the corresponding checkpoint file to memory. The above is also further described in detail in "Checkpoint and Migration of UNIX Processes in the Condor Distributed Processing System," by Todd Tannenbaum and Michael Litzkow, Dr. Dobbs's Journal, 227:40–48, February 1995; and in "Checkpoint and Migration of UNIX Processes in the Condor Distributed Processing System", by Michael Litzkow, Todd Tannenbaum, Jim Basney, and Miron Livny, University of Wisconsin-Madison Computer Science Technical Report #1346, April 1977, each of which is hereby incorporated herein by reference in its entirety.

After restoring all of the needed information from the checkpoint file, the checkpoint file is closed, STEP 1022, and the return code is set to one, STEP 1024. Thereafter, a long jump to the stack location that the process was at when the stack contents were written is performed, STEP 1026. In particular, this places the flow at INQUIRY 920 "RETURN CODE=1?" in FIG. 9.

Figure 11:
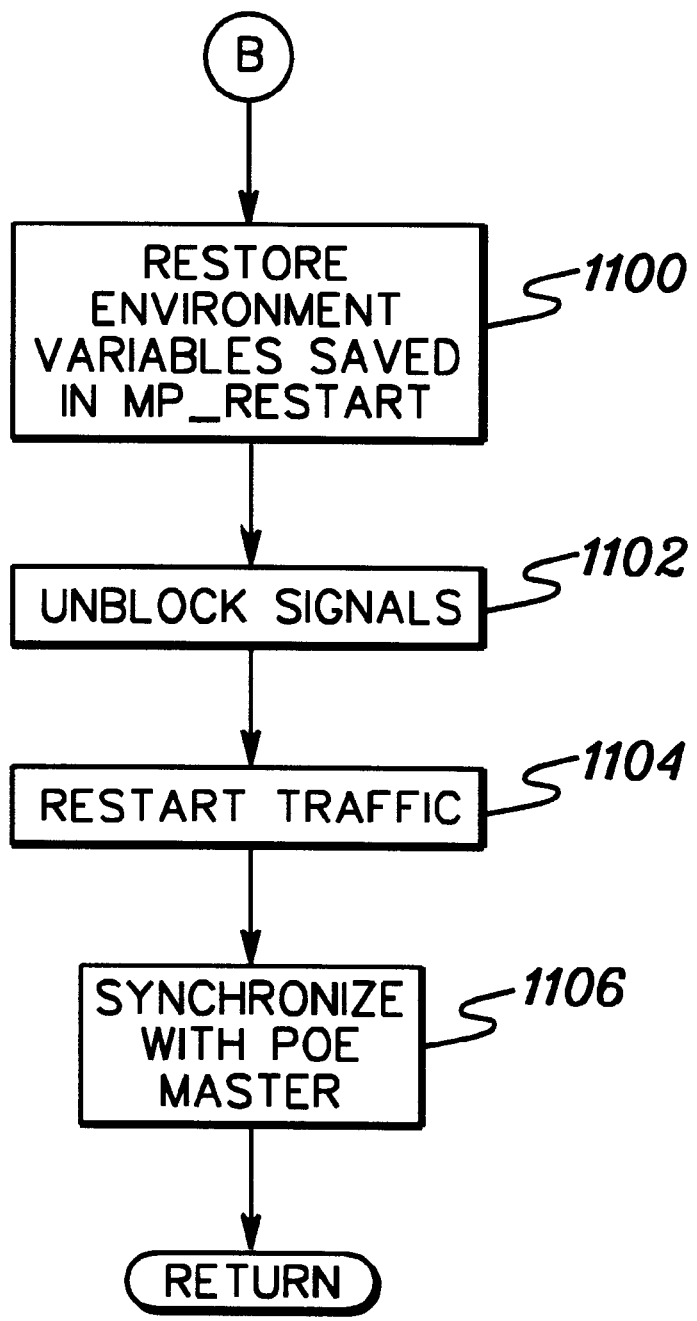
FIG. 11 depicts one embodiment of additional logic used to handle a restart, in accordance with the principles of the present invention.

Since the return code is equal to one, the restart processing continues. The environment variables saved in restart at STEP 1006 are restored, by replacing the old values that are stored in the Data Section that was restored at STEP 1012 with the current values, STEP 1100 (FIG. 11). This provides the current operating environment that the process is to run in.

Subsequently, any signals that were blocked during checkpointing are unblocked, STEP 1102. That is, when the signal state was restored in STEP 1016, certain signals were blocked, since that was the state of the processing when the checkpoint was taken. Thus, those signals are unblocked before the process continues to run.

In addition to the above, MPI traffic is restarted in order to allow message traffic to flow once again, STEP 1104. Thereafter, conventional synchronization with the coordinating process is performed, STEP 1106. This completes the restart processing.

In one embodiment, the same number of processes are to be restarted as was processing before the checkpoint was taken. The number of processes is available from the environment variables. Thus, each of the processes runs the restart processing.

One example of how to perform the restart operation using pseudocode is depicted below:

```
mp_restart( )
    saveSomeEnvironmentVariables ( );
    chkptFd=openChkptFile( );
    restoreDataSegment(chkptFd);
    restoreFileOffsets ( );
    restoreSignalInfo ( );
    mp_resoreMPIData(chkptFd);
    restoreStack(chkptFd);
    /* This longjmps to savestack with rc=1, and hence
    invokes handlerestart. It also closes the checkpoint
    file. */
handleRestart ( )
    restoreSomeEnvironmentVariables ( );
    unblocksignals ( );
    mp_restartMPI ( );
    performPOESync ( );
```

Figure 12:
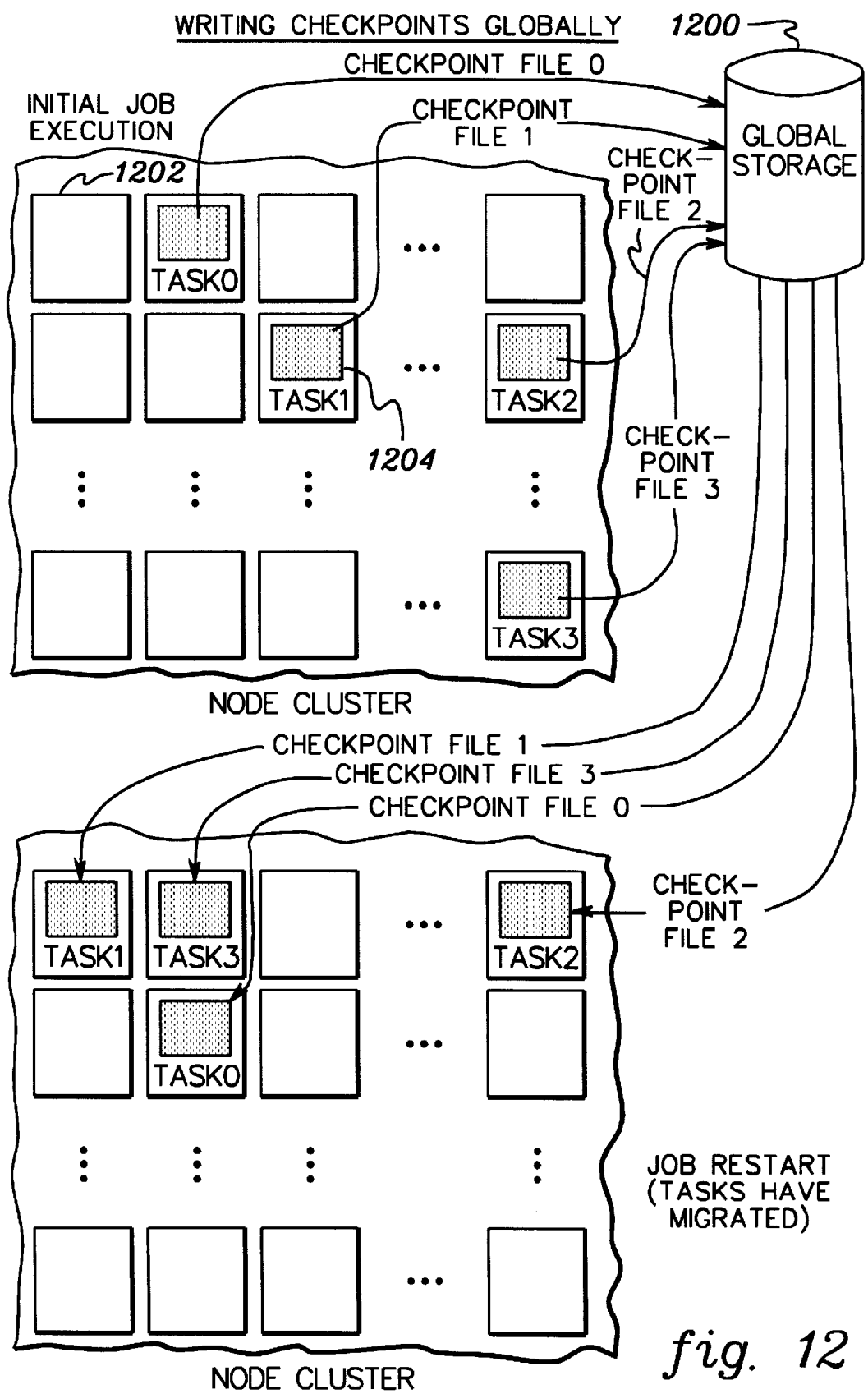
FIG. 12 depicts one embodiment of writing checkpoints to global storage, in accordance with the principles of the present invention.

In accordance with the principles of the present invention, the checkpoint files generated by the processes of a parallel program are stored on either global or local storage. One example of global storage is shown in FIG. 12.

A global storage 1200 is storage that is not stored on the computing units (i.e., it is external to the computing units.) It includes, for instance, a global file system, such as the Global Parallel File System (GPFS), offered by International Business Machines Corporation. The global storage is coupled to a plurality of computing units or nodes 1202 of a node cluster. A process 1204 resides on a computing unit and takes a checkpoint by writing to a named checkpoint file for that process. The checkpoint file is stored on the global storage. Thus, the global storage is accessible by all the processes of the node cluster.

The storing of the checkpoint files on global storage has the advantage of enabling the processes to be restarted on different computing units than they were previously executing on. That is, the processes are able to migrate to different computing units and still be restarted using their checkpoint files. (In one embodiment, the type of hardware and level of operating system of the migrated machine are similar to the machine used to take the checkpoint.) Migration is shown in FIG. 12. During the restart process, the same number of computing units, or fewer or more computing units are used to restart the processes of the parallel program.

Figure 13:
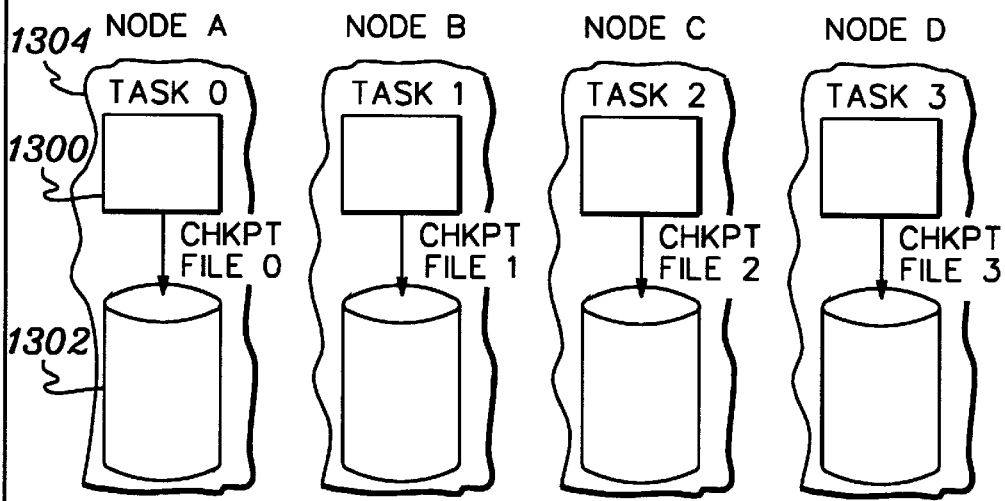
FIG. 13 depicts one embodiment of writing checkpoints to local storage, in accordance with the principles of the present invention.
Figure 13:
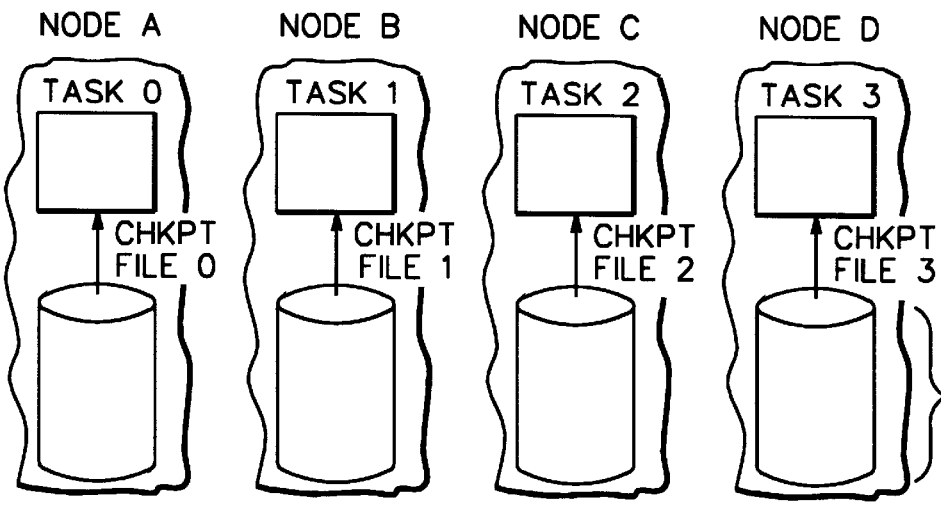

Local storage may also be used to store the is checkpoint files. As shown in FIG. 13, when local storage is used, a process 1300 writes to a checkpoint file, corresponding to that process, and the checkpoint file is stored on storage 1302 local to a computing unit 1304. However, if local storage is used, then the process needs to be restarted on the same computing unit that it was originally initiated on, unless the checkpoint file is also moved (or the local storage is shared with another computing unit via a hardware connection such as a Serial Storage Adapter (SSA) loop offered by International Business Machines Corporation).

Described in detail above are checkpoint/restart capabilities employed by parallel programs. The techniques of the present invention advantageously enable each process of a parallel program to internally perform checkpointing and restarting of the process. Further, it provides for the checkpointing of in-transit message data. The capabilities of the present invention enable the checkpointing of in-transit message data (and other data) to occur without requiring that the data first be logged to a log file. Additionally, the capabilities of the present invention provide for the committing of the checkpoint files, when checkpointing is done, so that there is only one checkpoint file for each process at restart time. The checkpoint files can be written to local or global storage, and when they are written to global storage, migration from one computing unit to another is facilitated.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of checkpointing parallel programs, said system comprising:
   means for taking a checkpoint of a parallel program, said parallel program comprising a plurality of processes, and wherein said means for taking a checkpoint comprises:
      means for writing, by a process of said plurality of processes, message data to a checkpoint file corresponding to said process, said message data including an indication that there are no messages, or including one or more in-transit messages between said process writing the message data and one or more other processes of said plurality of processes.

2. The system of claim 1, wherein said means for taking a checkpoint further includes means for writing, by a process of said plurality of processes, at least one of a data section, a signal state and one or more file offsets to a checkpoint file corresponding to said process writing said at least one of said data section, said signal state and one or more file offsets.

3. The system of claim 1, wherein said means for taking a checkpoint further includes means for writing, by a process of said plurality of processes, at least one of executable information, stack contents, and register contents to a checkpoint file corresponding to said process writing said at least one of said executable information, said stack contents and said register contents.

4. The system of claim 1, wherein said means for writing said message data to said checkpoint file is performed without logging said message data to a log file.

5. The system of claim 1, wherein said checkpoint file is stored in local storage accessible by said process.

6. The system of claim 1, wherein said checkpoint file is stored in global storage accessible by said plurality of processes of said parallel program.

7. The system of claim 1, further comprising means for restoring said process that wrote said message data to said checkpoint file, wherein said means for restoring comprises means for copying said message data from said checkpoint file to memory of a computing unit executing said process.

8. The system of claim 7, wherein said computing unit executing said process is a different computing unit from when said checkpoint was taken by said process.

9. The system of claim 1, wherein said means for taking a checkpoint further comprises means for taking a checkpoint by a number of processes of said plurality of processes, wherein said means for taking a checkpoint by said number of processes comprises means for writing data to a number of checkpoint files, wherein each process of said number of processes takes a corresponding checkpoint.

10. The system of claim 9, further comprising means for coordinating the taking of said corresponding checkpoints by said number of processes.

11. The system of claim 10, wherein said means for coordinating comprises:
   means for sending a ready message from each process of said number of processes to a coordinating task indicating readiness to take said corresponding checkpoint; and
   means for providing, by said coordinating task to said each process, a message indicating that said corresponding checkpoint is to be taken, said providing occurring after receipt of said ready message from said each process.

12. The system of claim 11, wherein said means for coordinating further comprises:
   means for sending a done message from said each process to said coordinating task indicating completion of said corresponding checkpoint; and
   means for forwarding, by said coordinating task to said each process, a commit message indicating that said corresponding checkpoint is to be committed, said forwarding occurring after receipt of said done message from said each process.

13. The system of claim 12, further comprising:
   means for committing, by each process of said number of processes, to said corresponding checkpoint; and
   means for deleting, by each process of said number of processes, any previous corresponding checkpoint information, after committing to said corresponding checkpoint.

14. A system of checkpointing parallel programs, said system comprising:
   a computing unit being adapted to write to a data section of a process of a parallel program at least one of a signal state and one or more file offsets, and to subsequently, write said data section to a checkpoint file corresponding to said process;
   said computing unit being further adapted to write message data to said checkpoint file, said message data including an indication that there are no messages, or including one or more in-transit messages between said process and one or more other processes of said parallel program; and
   said computing unit being further adapted to write at least one of executable information, stack contents and register contents to said checkpoint file.

15. The system of claim 14, wherein said computing unit is further adapted to perform at least one of stopping message traffic of said process and blocking signals of said process, prior to writing to said data section.

16. The system of claim 15, wherein said parallel program has a plurality of processes, and wherein one or more computing units are adapted to take a checkpoint by said plurality of processes.

17. The system of claim 16, wherein said one or more computing units are adapted to restore said parallel program using the checkpoints taken by said plurality of processes.

18. A system of restoring parallel programs, said system comprising:

means for restarting one or more processes of a parallel program on one or more computing units, wherein at least one process of said one or more processes is restarted on a different computing unit from the computing unit that was previously used to take at least one checkpoint for said at least one process; and means for copying data stored in one or more checkpoint files corresponding to said one or more restarted processes into memory of said one or more computing units executing said one or more restarted processes, wherein said data restores said one or more restarted processes to an earlier state.

19. The system of claim 18, wherein said one or more checkpoint files are stored in global storage accessible by said one or more computing units.

20. A system of checkpointing parallel programs, said system comprising:

means for indicating, by a process of a parallel program, that said process is ready to take a checkpoint;

means for receiving, by said process, an indication to take said checkpoint;

means for taking said checkpoint, wherein said means for taking said checkpoint comprises means for having said process copy data from memory associated with said process to a checkpoint file corresponding to said process; and means for indicating, by said process, completion of said taking of said checkpoint.

* * * * *

UNITED STATES PATENT AND TRADEMARK OFFICE
CERTIFICATE OF CORRECTION

PATENT NO. : 6,401,216 B1  Page 1 of 1
DATED : June 4, 2002
INVENTOR(S) : Meth et al.

It is certified that error appears in the above-identified patent and that said Letters Patent is hereby corrected as shown below:

Column 12,
Line 48, delete the word "is"

Signed and Sealed this

Eighth Day of October, 2002

Attest:

Attesting Officer

JAMES E. ROGAN
Director of the United States Patent and Trademark Office